(12) United States Patent
Matsuda

(10) Patent No.: US 7,367,328 B2
(45) Date of Patent: May 6, 2008

(54) FOUR-CYCLE ENGINE AND MOTORCYCLE COMPRISING FOUR-CYCLE ENGINE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 11/588,820

(22) Filed: Oct. 27, 2006

(65) Prior Publication Data

US 2007/0095335 A1 May 3, 2007

(30) Foreign Application Priority Data

Oct. 28, 2005 (JP) ............................. 2005-313881

(51) Int. Cl.
*F02B 25/06* (2006.01)
*F02B 41/00* (2006.01)
(52) U.S. Cl. ............ 123/572; 123/198 C; 123/196 CP; 123/198 P
(58) Field of Classification Search ................ 123/572, 123/574, 197.1, 195 R, 195 AC, 198 C, 198 P, 123/73 PP, 196 CP
See application file for complete search history.

(56) References Cited

U.S. PATENT DOCUMENTS

| 4,465,030 A | * | 8/1984 | Maurer ................... 123/198 P |
| 5,239,972 A | * | 8/1993 | Takeyama et al. .......... 123/573 |
| 6,148,807 A | * | 11/2000 | Hazen ........................ 123/572 |
| 7,007,682 B2 | * | 3/2006 | Takahashi et al. .......... 123/572 |
| 7,040,306 B2 | * | 5/2006 | Moriyama et al. .......... 123/572 |
| 7,159,582 B2 | * | 1/2007 | Nakajima et al. ........... 123/572 |

FOREIGN PATENT DOCUMENTS

JP          05-060000          3/1993

\* cited by examiner

*Primary Examiner*—Hai Huynh
(74) *Attorney, Agent, or Firm*—Alleman Hall McCoy Russell & Tuttle LLP

(57) ABSTRACT

A four-cycle engine including an engine case configured to accommodate a crankshaft; a pump configured to suction air from an inner space of the engine case; and an air suction passage through which the inner space inner space of the engine case and the pump communicate with each other; wherein the air suction passage extends to the pump through an upper region of the engine case.

10 Claims, 5 Drawing Sheets

FOUR-CYCLE ENGINE AND MOTORCYCLE COMPRISING FOUR-CYCLE ENGINE

TECHNICAL FIELD

The present invention generally relates a four-cycle engine and a motorcycle comprising the four-cycle engine. More particularly, the present invention relates to a structure for suctioning air from an inner space of an engine case to reduce pumping losses, thereby improving performance of the engine.

BACKGROUND ART

In a four-cycle engine, a piston reciprocates in the interior of a cylinder block, and a crankshaft accommodated in the interior of an engine case converts the reciprocation of the piston into a rotation to be output to the outside. In the four-cycle engine, various mechanical losses increase with an increase in an engine speed of the engine. Among the mechanical losses, pumping loss is known. The term "pumping loss" refers to a resistance to the reciprocation of the piston, and is mainly caused by air, including a blow-by gas in the interior of the engine case.

Japanese Laid-Open Patent Application Publication No. Hei. 5-60000 discloses a four-cycle engine devised to reduce pumping losses. This engine includes a vacuum pump operative in association with a rotation of a crankshaft accommodated in an engine case and an air chamber that is connected to the engine case and is maintained at a negative pressure by the vacuum pump. The vacuum pump operates according to an engine speed of the crankshaft to suction air from the inner space of the engine case, thereby maintaining the inner space of the engine case at a negative pressure.

In the inner space of the engine, oil droplets or oil mist exist, for example, cooling oil injected to a back surface of the piston, and oil scattered from a surface of the crankshaft during rotation. Some four-cycle engines are equipped with a breather for separating the oil from the air to suppress suctioning of the air containing the oil droplets or the oil mist. In order to suitably separate the oil from the air, it is necessary to increase a capacity of the breather or to equip a centrifugal device to separate the oil from the air. This may undesirably increase a weight, a dimension, and a manufacturing cost of the engine.

SUMMARY OF THE INVENTION

The present invention addresses the above described conditions, and an object of the present invention is to provide a four-cycle engine that is configured to suction air from an inner space of an engine case to reduce an internal pressure therein to thereby suppress pumping losses of a piston, and is capable of suitably separating the oil from the air with a suitable construction, and a motorcycle comprising the four-cycle engine.

According to one aspect of the present invention, there is provided a four-cycle engine comprising an engine case configured to accommodate a crankshaft; a pump configured to suction air from an inner space of the engine case; and an air suction passage through which the inner space of the engine case and the pump communicate with each other; wherein the air suction passage extends to the pump through an upper region of the engine case.

In such a construction, the pump suctions the air from the inner space of the engine case to reduce an internal pressure of the engine case, thereby suppressing pumping losses. Even if the oil scattered in the inner space of the engine case enters the air suction passage, it drops by its own weight and is returned to the inner space of the engine case, before moving to outside the engine case through the air suction passage. Therefore, it is possible to suppress entry of oil droplets or oil mist into the air suctioned toward the pump with a simple construction. As used herein, the term "engine case" is meant to include a crankcase and a transmission case in an engine in which the crankcase and the transmission case are integral with each other and to include either one of them in an engine in which the crankcase and the transmission are separate from each other.

One end portion of the air suction passage that is closer to the engine case may be positioned at a location lateral to a rotatable element configured to rotate in association with the crankshaft in an interior of the engine case. During rotation of the rotatable element such as a gear, the oil adhering to the rotatable element scatters radially but does not substantially scatter toward an opening formed at one end portion of the air suction passage constructed above.

The four-cycle engine may further comprise a transmission configured to change a rotational speed of the crankshaft. The transmission may have a driven gear to which rotation is transmitted from the crankshaft, and the rotatable element may be the driven gear. For example, the driven gear may be a primary gear of the transmission. In general, the driven gear has a relatively large diameter and its rotational speed is relatively slow. Therefore, the amount of oil scattering around the driven gear is less. In this construction, therefore, it becomes possible to further suppress entry of the oil into the air suction passage. In a further alternative engine which is equipped with a balancer rotatable in association with the crankshaft, one end portion of the air suction passage may be located laterally of the balancer.

The four-cycle engine may further comprise a generator configured to generate electric power by rotation of the crankshaft. The pump may be an electric pump configured to operate by the electric power generated in the generator. Since the operation of the electric pump can be controlled independently of the rotation of the engine, the internal pressure of the engine case can be controlled suitably.

The four-cycle engine may further comprise a pump operation control unit configured to cause the electric pump to operate when a voltage of the electric power generated in the generator is a predetermined value or more. For example, a motorcycle is equipped with a circuit or a light that is activated by the electric power generated in the generator, and the electric power consumed in these electric loads (excluding the electric pump) is limited in amount. When the engine E operates at a high engine speed of a predetermined value or more, an excess electric power that is more than that consumed in the electric loads is generated. Typically, the regulator or the like maintains the voltage supplied to the circuit or the like at a substantially constant value, and converts the excess power into heat. In the above construction, when the amount of electric power generated in the generator is relatively small, the electric pump is not operated and the electric power required to drive the circuit is ensured, whereas when the engine speed is high and the excess electric power is generated in the generator, the electric pump is operated by the excess electric power to reduce the internal pressure of the engine case.

The four-cycle engine may further comprise a breather disposed upstream or downstream of the pump in an air flow direction and is configured to separate oil from the air. In such a construction, liquid such as the oil can be separated from the air.

The four-cycle engine may further comprise an air-intake system configured to guide the air taken in from outside to a combustion chamber formed by a cylinder block and a cylinder head, an exhaust system configured to guide an exhaust gas from the combustion chamber to the outside, and an air guide passage through which the air that has flowed through the pump and the breather is guided to the air-intake system or to the exhaust system. Even if the air that has flowed through the breather contains some oil, the oil can be combusted in the combustion chamber together with the air when the air is guided to the air-intake system, or the oil can be combusted by the high-temperature exhaust gas when the air is guided to the exhaust system.

The engine case may include a crank chamber configured to accommodate the crankshaft, and a transmission chamber that is substantially separated from the crank chamber and is configured to accommodate a transmission. One end portion of the air suction passage that is closer to the engine case may open in an inner space of the crank chamber. The engine may further comprise an air supply passage through which the air suctioned through the air suction passage is delivered to the transmission chamber. In such a construction, the oil can be suitably separated from the air.

The four-cycle engine may further comprise an air discharge passage through which the air in the inner space of the transmission chamber is guided to the outside of the engine case, and a control valve that is provided in the air discharge passage and is configured to control an internal pressure of the transmission chamber. In such a construction, the internal pressure of the transmission chamber can be controlled correctly.

According to another aspect of the present invention, there is provided a motorcycle comprising a four-cycle engine including an engine case configured to accommodate a crankshaft, a pump configured to suction air from an inner space of the engine case, and an air suction passage through which the inner space of the engine case and the pump communicate with each other; wherein the air suction passage extends to the pump through an upper region of the engine case.

In such a construction, the motorcycle is equipped with an engine that is configured to suction the air from the inner space of the engine case to reduce the internal pressure of the engine case, thereby suppressing pumping losses, and is able to suppress entry of the oil droplets or the oil mist into the air to be suctioned. The above described four-cycle engine can be mounted into leisure vehicles other than a motorcycle, such as a personal watercraft (PWC) or four-wheeled all terrain vehicles.

The above and further objects and features of the invention will more fully be apparent from the following detailed description with accompanying drawings.

DETAILED DESCRIPTION OF THE PREFERRED EMBODIMENTS

Hereinafter, embodiments of a four-cycle engine and a motorcycle comprising the four-cycle engine according to the present invention will be described with reference to the accompanying drawings. As used herein, the term "directions" refers to directions from the perspective of a rider mounting the motorcycle, except for a case specifically illustrated.

Figure 1:
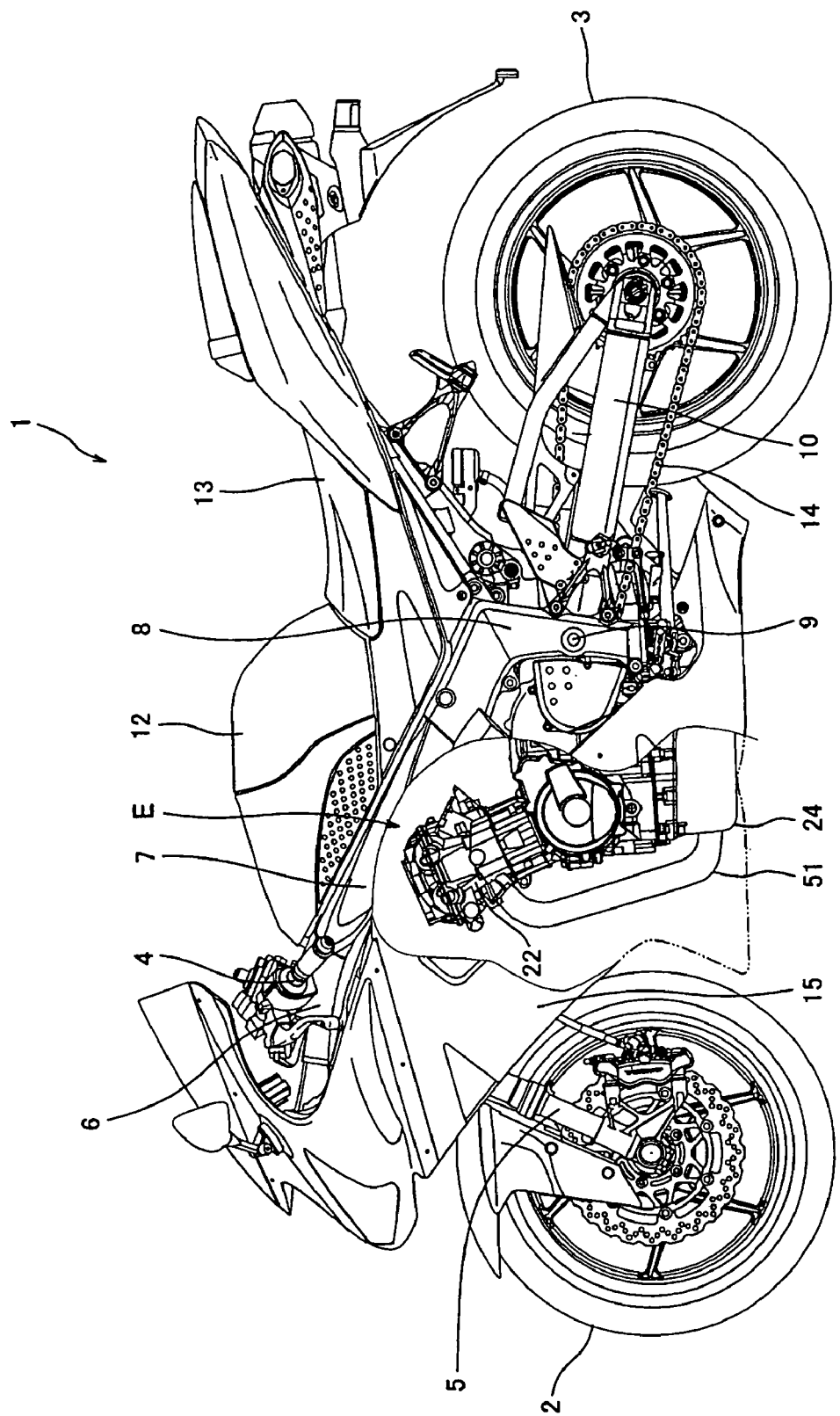
FIG. 1 is a left side view of a motorcycle in which a four-cycle engine according to an embodiment of the present invention is mounted.

Turning now to FIG. 1, the motorcycle 1 includes a front wheel 2 and a rear wheel 3. The front wheel 2 is rotatably mounted to a lower end portion of a front fork 5 extending substantially vertically. The front fork 5 is mounted to a steering shaft (not shown) by an upper bracket (not shown) provided at an upper end portion thereof and an under bracket provided below the upper bracket. The steering shaft is rotatably supported by a head pipe 6 disposed at a front portion of a vehicle body frame of the motorcycle 1. A bar-type steering handle 4 extending in a lateral direction of a vehicle body of the motorcycle 1 is attached to the upper bracket. When the rider rotates the steering handle 4 clockwise or counterclockwise, the front wheel 2 is turned around the steering shaft to a desired direction.

A pair of right and left main frames 7 (only left main frame 7 is illustrated in FIG. 1) extend rearward from the head pipe 6. Pivot frames (swing arm brackets) 8 extend downward from rear regions of the main frames 7. A swing arm 10 is pivotally mounted at a front end portion thereof to a pivot 9 attached on the pivot frame 8. The rear wheel 3 is rotatably mounted to a rear end portion of the swing arm 10.

A fuel tank 12 is disposed above the main frames 7 and behind the steering handle 4. A straddle-type seat 13 is disposed behind the fuel tank 12. An engine E is mounted between and under the right and left main frames 7. The engine E is coveted with a cowling 15 from the side. The engine E is an in-line four-cylinder four-cycle engine, and is constructed in such a manner that a crankshaft 18 (see FIG. 2) extends in the lateral direction of the vehicle body. An output of the engine E is transmitted, through a chain 14, to the rear wheel 3, which thereby rotates. In this manner, the motorcycle 1 obtains a driving force.

Embodiment 1

Figure 2:
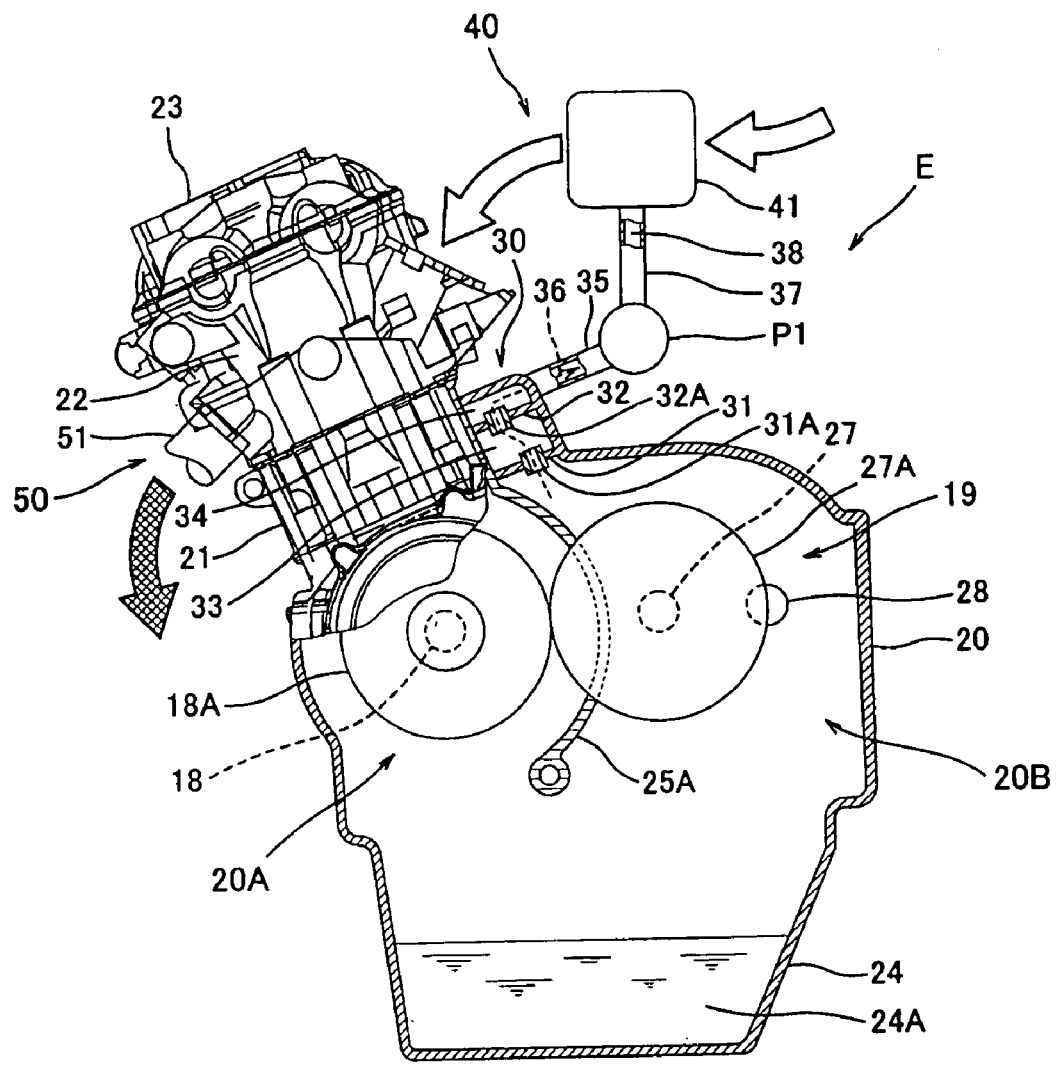
FIG. 2 is a left side view of the engine mounted in the motorcycle of FIG. 1 according to a first embodiment, a lower wall portion of which is cut away to illustrate an internal structure.

FIG. 2 is a left side view of the engine E mounted in the motorcycle 1 of FIG. 1 according to the first embodiment, a lower wall portion of which is cut away to illustrate an internal structure. Turning now to FIG. 2, the engine E includes an engine case 20 that accommodates the crankshaft 18 and a transmission 19, and a cylinder block 21 that is coupled to an upper portion of the engine case 20 and is configured to form four cylinders arranged in parallel. The cylinder block 21 is disposed such that each cylinder is tilted slightly forward. The engine E further includes a cylinder head 22 that is coupled to an upper portion of the cylinder block 21 and is configured to form a combustion chamber (not shown) together with the cylinder block 21, and a cylinder head cover 23 covering the cylinder head 22 from above. An exhaust pipe 51, which belongs to an exhaust system 50, extends downward from a front portion of the cylinder head 22.

In this embodiment, the engine case 20 has a crank chamber 20A which is a front inner space for accommodating the crankshaft 18, and a transmission chamber 20B which is a rear inner space for accommodating the transmission 19. The crank chamber 20A and the transmission chamber 20B are substantially separated from each other by a separating wall 25A extending downward from an upper portion of the engine case 20, but are fluidically connected to each other at lower portions thereof. An oil pan 24 is provided at a lower portion of the engine case 20 and has a space which is connected to the crank chamber 20A and the transmission chamber 20B. The oil pan 24 is configured to store oil 24A circulating in the interior of the engine E. In this embodiment, the engine E employs a wet sump lubrication system in which an oil pump (not shown) feeds with a pressure the oil 24A stored in the oil pan 24 to engine components. The oil pan 24 is located on the left side of the engine case 20 as viewed from the front. The exhaust pipe 51 extends downward from the cylinder head 22, and rearward through the right side of the oil pan 24 below the engine case 20 (see FIG. 1).

The transmission 19 includes a main shaft 27 and a counter shaft 28 in the interior of the transmission chamber 20B. A drive gear 18A is concentrically mounted on an end portion of the crankshaft 18 and is in mesh with a driven gear (primary gear) 27A concentrically mounted on an end portion of the main shaft 27. In this construction, upon the crankshaft 18 rotating, the drive gear 18A and the driven gear 17A rotate, causing the transmission 19 to operate.

A breather 30 is mounted at an upper portion of the engine case 20. The breather 30 is box-shaped, and is disposed at a corner region formed by an upper wall surface of the engine case 20 and a rear wall surface of the cylinder block 21. An inner space of the breather 30 is separated from the inner space (transmission chamber 20B) of the engine case 20 by a separating plate 31 and is separated into a lower space 33 and an upper space 34 by a separating plate 32. The lower space 33 of the breather 30 communicates with the transmission chamber 20B through a first communication pipe 31A penetrating through the separating plate 31, and the lower space 33 communicates with the upper space 34 through a second communication pipe 32A penetrating through the separating plate 32.

One end portion of a suction pipe 35 is coupled to the upper space 34 of the breather 30. The suction pipe 35 extends to outside of the breather 30. An opposite end portion of the suction pipe 35 is coupled to a pump P1. The pump P1 is a mechanical pump operative in association with the rotation of the crankshaft 18. Inner passages of the first communication pipe 31A, the lower space 33, the second communication pipe 32A, the upper space 34, and the suction pipe 35 form an air suction passage 36, through which the inner space of the engine case 20 and the pump P1 communicate with each other. An air guide pipe 37 extends from the pump P1 to an air cleaner box 41 which belongs to an air-intake system 40 of the engine E. The pump P1 communicates with the air cleaner box 41 through an air guide passage 38 which is an inner space of the air guide pipe 37.

In the engine E constructed above, upon a pumping operation of the pump P1, the air is suctioned from the inner space of the engine case 20 through the air suction passage 36. Since the air suction passage 36 extends through the upper portion of the engine case 20, suctioning of the oil droplets or the oil mist together with the air toward the pump P1 is suppressed, because the oil droplets or the -oil mist move downward by a gravitational force. In addition, since the pump P1 suctions the air from the inner space of the engine case 20, the internal pressure of the engine case 20 is reduced. This makes it possible to suppress mechanical losses such as pumping losses generated during running of the engine E. Furthermore, since the suctioned air is guided to the air-intake system 40, some oil contained in the air is combusted in the combustion chamber (not shown) of the engine E.

Whereas in this embodiment, the air guide pipe 37 extends from the pump P1 to the air-intake system 40, it may alternatively extend to the exhaust system 50 to guide the air suctioned from the inner space of the engine case 20 to the exhaust system 50. In that case, some oil contained in the air is combusted by a high-temperature exhaust gas.

Embodiment 2

Figure 3:
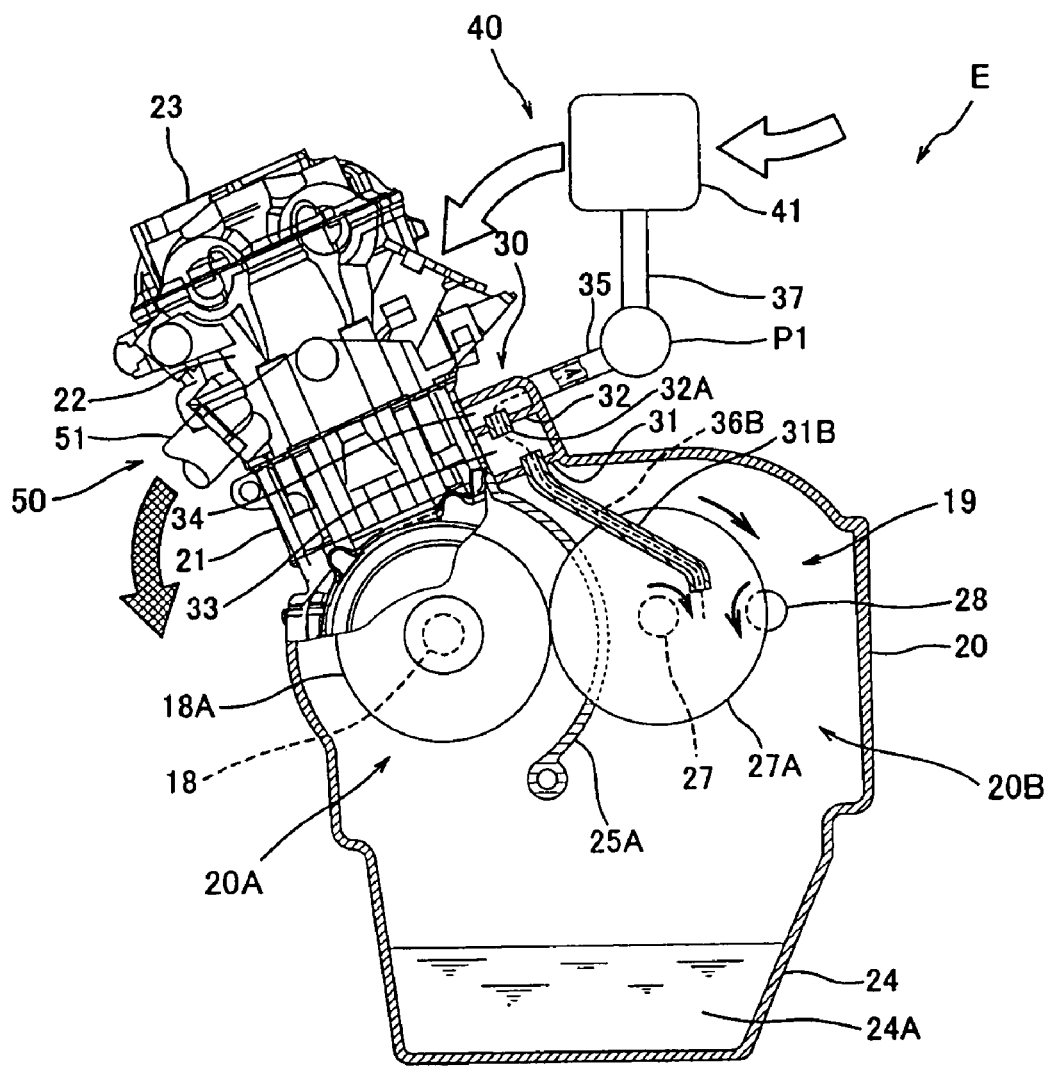
FIG. 3 is a left side view of the engine mounted in the motorcycle of FIG. 1 according to a second embodiment, a lower wall portion of which is cut away to illustrate an internal structure.

FIG. 3 is a left side view of the engine E mounted in the motorcycle 1 of FIG. 1 according to a second embodiment, a lower wall portion of which is cut away to illustrate an internal structure. Since the engine case 20, the cylinder block 21, the cylinder head 22, the cylinder head cover 23, the oil pan 24, and the like of the engine E of FIG. 3 are identical in construction to those of the engine E of FIG. 2, they will not be further described.

In the engine E illustrated in FIG. 3, an air suction passage 36B of FIG. 3 is different in structure from the air suction passage 36 in FIG. 2. In the engine E of FIG. 3, a first communication pipe 31B forming an upstream portion of the air suction passage 36B extends downward to a location lateral of the driven gear 27A in the transmission chamber 20B. An upstream end portion of the air suction passage 36B in the air flow direction is located laterally of the driven gear 27A and in close proximity to the main shaft 27 which is the rotational shaft of the driven gear 27A. In other respects, the air suction passage 36B is identical in structure to the air suction passage 36 of FIG. 2.

With such a construction, it becomes possible to effectively suppress entry of the oil droplets or the oil mist into the air suction passage 36B. During rotation of the driven gear 27A, the oil adhering to an outer peripheral region of the driven gear 27A scatters radially but does not scatter toward the location lateral of the driven gear 27A or in close proximity to the main shaft 27, i.e., toward an upstream end portion of the air suction passage 36B. Since the driven gear 27A has a relatively large diameter and its rotational speed is relatively slow, the amount of oil scattered during the rotation of the driven gear 27A is relatively small. By positioning the upstream end portion of the air suction passage 36B at the location lateral of the driven gear 27A, it becomes possible to effectively suppress entry of the oil droplets or the oil mist into the air suction passage 36B.

As shown in FIG. 3, by causing the upstream end portion of the first communication pipe 31B to open substantially downward between the main shaft 27 and the counter shaft 28, it becomes possible to further suppress the entry of the oil into the air suction passage 36B. This is because the oil adhering to the main shaft 27 scatters rearward or downward according to the clockwise rotation of the main shaft 27 as seen in a left side view and the oil adhering to the counter shaft 28 scatters forward or downward according to counterclockwise rotation of the counter shaft 28 as seen in the left side view in a region between the main shaft 27 and the counter shaft 28. Since the upstream end portion of the first communication pipe 31B opens substantially downward in the region, it is possible to effectively suppress entry of the oil from the upstream end portion of the first pipe 31B into the air suction passage 36B.

In a case where the engine E is equipped with a balancer (not shown) operative in association with the crankshaft 18, it is also possible to effectively suppress entry of the oil into the air suction passage 36B by positioning the upstream end portion of the air suction passage 36B at a location lateral to the balancer.

Embodiment 3

Figure 4:
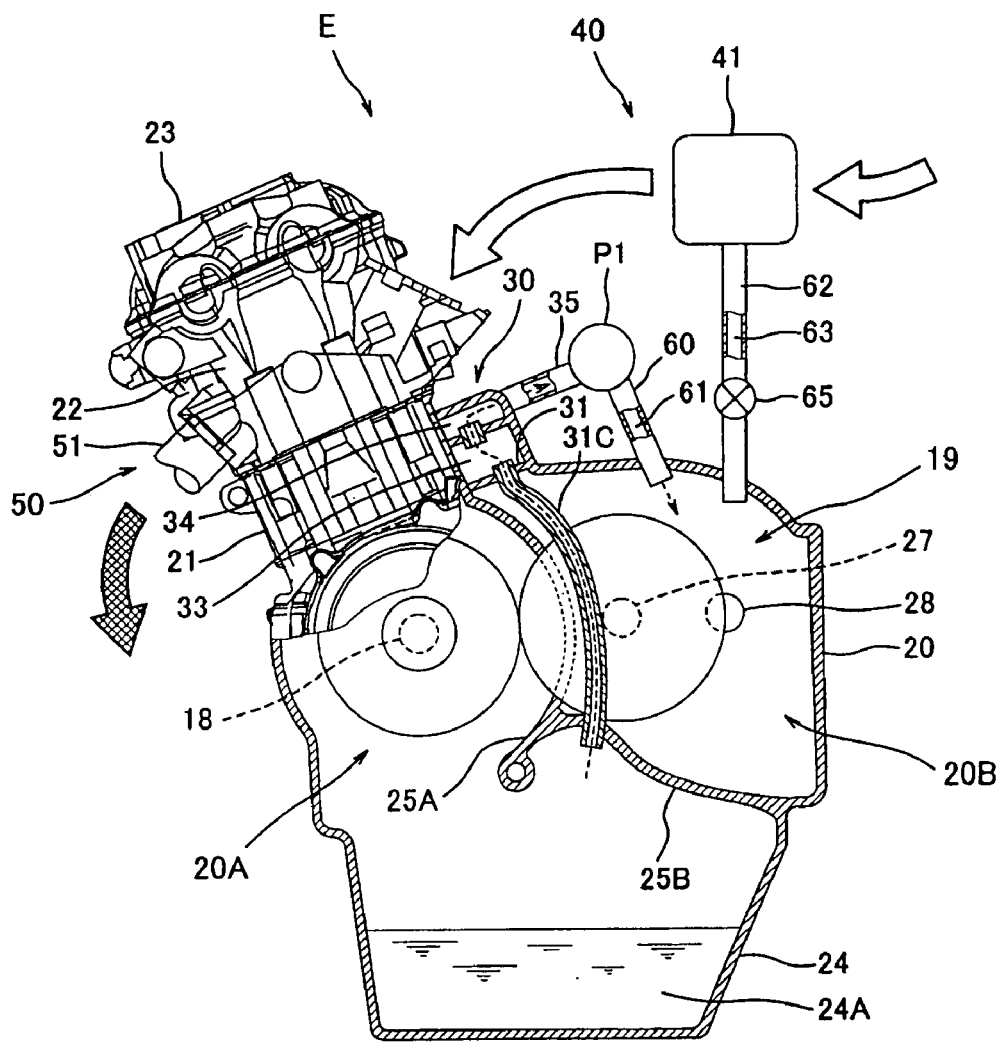
FIG. 4 is a left side view of the engine mounted in the motorcycle of FIG. 1 according to a third embodiment, a lower wall portion of which is cut away to illustrate an internal structure.

FIG. 4 is a left side view of the engine E mounted in the motorcycle 1 of FIG. 1 according to a third embodiment, a lower wall portion of which is cut away to illustrate an internal structure. Since the cylinder block 21, the cylinder head 22, the cylinder head cover 23, the oil pan 24, and the like of the engine E of FIG. 3 are identical in construction to those of the engine E of FIG. 2, they will not be further described.

In the engine E of FIG. 4, the transmission chamber 20B is separated from the crank chamber 20A in the interior of the engine case 20 and forms a sealed space. A second separating wall 25B extends rearward from a lower portion of the first separating wall 25A extending downward from the upper portion of the engine case 20, through a region below the transmission 19, and to a rear wall portion of the engine case 20. The first separating wall 25A and the second separating wall 25B serve to separate the transmission chamber 20B from the crank chamber 20A in the interior of the engine case 20. A first communication pipe 31C penetrates through the separating plate 31 that defines the lower space 33 of the breather 30 and the transmission chamber 20B. In this embodiment, the first communication pipe 31C extends downward from the separating plate 31 through the transmission chamber 20B and penetrates through the second separating wall 25B, and an upstream end portion thereof opens in the space formed above the oil pan 24 and is connected to the crank chamber 20A.

The suction pipe 35 extends from the breather 30 to the pump P1. An air supply pipe 60 extends from the pump P1 instead of the air guide pipe 37 illustrated in FIGS. 2 and 3. A downstream end portion of the air supply pipe 60 is coupled to an upper portion of the engine case 20 and opens in the inner space of the transmission chamber 20B. Therefore, the pump P1 and the inner space of the transmission chamber 20B communicate with each other through an air supply passage 61 which is an inner passage of the air supply pipe 60. An air discharge pipe 62 extends from the engine case 20 at an upper region of the transmission chamber 20B to the air cleaner box 41. The air cleaner box 41 and the inner space of the transmission chamber 20B communicate with each other through an air discharge passage 63 which is an inner passage of the air discharge pipe 62. A pressure control valve 65 is provided at a location of the air discharge passage 63. The pressure control valve 65 is configured to be opened when an internal pressure in the transmission chamber 20B becomes a predetermined value or more and is configured to be closed when the internal pressure becomes less than the predetermined value.

In the engine E constructed above, the air flows through the first pipe 31C and the breather 30, and enters the transmission chamber 20B. Thereafter, the air is delivered to the air cleaner box 41 through the air discharge passage 63. Therefore, the oil can be separated efficiently from an air-oil mixture. In the construction of FIG. 4, the air discharge passage 63 extends upward from the transmission chamber 20B, the oil does not substantially flow toward the air cleaner box 41 even if the oil enters the transmission chamber 20B. The pressure control valve 65 provided in the air discharge passage 63 enables the internal pressure in the transmission chamber 20B to be maintained at a correct value, in which state, lubricating oil suitably leaks from passages (not shown) formed in the shafts 27 and 28 to suitably lubricate components of the transmission 19. When the internal pressure in the transmission chamber 20B is high, the pressure control valve 65 is opened to discharge air, which is delivered to the combustion chamber of the engine E through the air cleaner box 41. Some oil contained in the air is combusted in the combustion chamber.

Whereas the pump P1 is disposed downstream of the breather 30 in the first to third embodiments, this order may alternatively be reversed.

Embodiment 4

Figure 5:
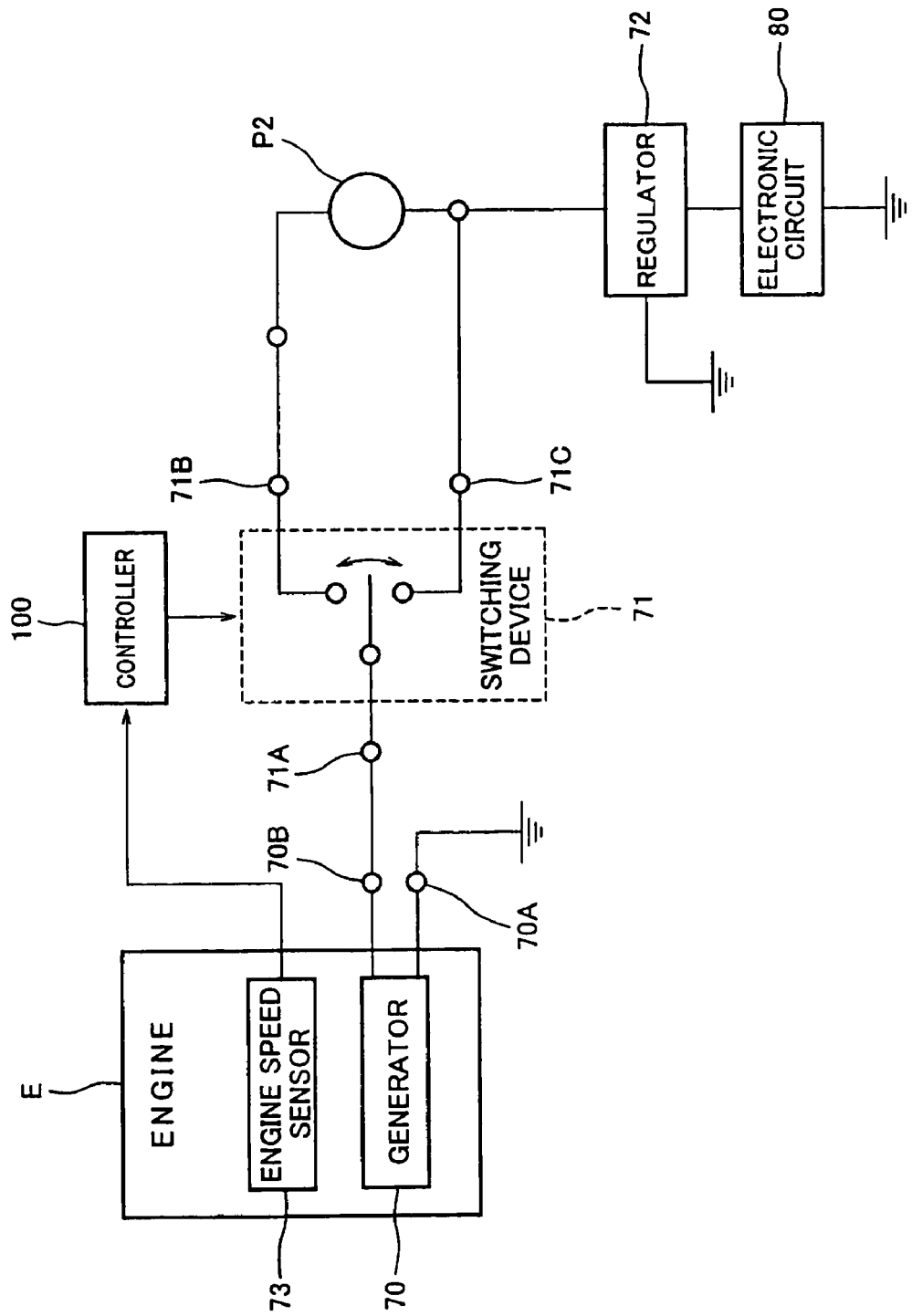
FIG. 5 is a block diagram schematically showing a configuration to couple the engine, an electric pump, and an electronic circuit.

In the above embodiments, the pump P1 is the mechanical pump operative in association with the rotation of the crankshaft 18. Alternatively, an electric pump P2 illustrated in FIG. 5 may be used. FIG. 5 is a block diagram schematically showing a configuration to couple the engine E, the electric pump P2, etc., which is applicable to the motorcycle 1 (see FIG. 1). As shown in FIG. 5, the engine E is equipped with a generator 70 for generating electric power, and the motorcycle 1 (see FIG. 1) is equipped with an electronic circuit 80 configured to operate by the electric power generated in the generator 70. The generator 70 generates the electric power using a magnet rotatable in association with the crankshaft 18 (see FIGS. 2 to 4) of the engine E, and a coil.

One terminal 70A of the generator 70 is electrically grounded, and an opposite terminal 70B is connected to an input terminal 71A of a switching device (pump operation control unit) 71. The switching device 71 has two output terminals 71B and 71C and is configured to connect the input terminal 71A to either the output terminal 71B or 71C, based on a signal input to the switching device 71 from a controller 100 equipped in the motorcycle 1. One terminal of the electric pump P2 is connected to the output terminal 71B of the switching device 71 and the electronic circuit 80 is coupled to an opposite terminal of the electric pump P2 through a regulator 72 connected in series. The output terminal 71C of the switching device 71 is connected to a junction of the electric pump P2 and the regulator 72. In the example illustrated in FIG. 5, the electronic circuit 80 and the controller 100 are separately illustrated, but the electronic circuit 80 may include the controller 100.

The generator 70 generates electric power which is substantially proportional to a square of the engine speed of the crankshaft 18 of the engine E. In general, a correct voltage value is determined for the electronic circuit 80. To protect the circuit, it is necessary to control the voltage value. The regulator 72 serves to regulate the voltage supplied to the electronic circuit 80 to less than a predetermined value. If the voltage exceeding the correct voltage value is applied to the electronic circuit 80 by a high-speed rotation of the crankshaft 18, then the regulator 72 regulates the voltage output to the electronic circuit 80 and converts excess electric energy into heat energy.

The controller 100 is communicatively coupled to an engine speed sensor 73 configured to detect the engine speed of the crankshaft 18 and is configured to receive a signal indicating the engine speed from the engine speed sensor 73.

The controller 100 is configured to determine whether or not the engine speed is a value that falls within a range in which the regulator 72 must regulate the voltage output to the electronic circuit 80, i.e., the value of the voltage generated in the generator 70 is a predetermined value or more and exceeds the correct voltage value for the electronic circuit 80.

If it is determined that the engine speed is a value that falls within the range, where the engine E is running at a high speed, then a predetermined signal is input to the switching device 71. In response to this signal, the switching device 71 connects the input terminal 71A to the output terminal 71B so that the output voltage from the generator 70 is applied to the electric pump P2, the regulator 72, and the electronic circuit 80 which are connected in series. On the other hand, if it is determined that the engine speed falls outside the range, where the engine E is running at a low speed, then the switching device 71 connects the input terminal 71A to the output terminal 71C so that the output voltage from the generator 70 is applied to the regulator 72 and the electronic circuit 80 connected in series.

In such a configuration, during the high-speed running of the engine E when pumping losses tend to be large, the electric pump P2 is operated by the excess electric power to suction the air from the crank chamber 20A to thereby reduce the internal pressure. As a result, pumping losses can be reduced. In this manner, the engine E can achieve high efficiency.

To be specific, when the engine E is running at a low speed and the voltage generated in the generator 70 is relatively low, the electronic pump P2 is not operated and a desired voltage is supplied to the electronic circuit 80 including the controller 100. On the other hand, when the engine E is running at a high speed and the voltage generated in the generator 70 is relatively high, the electric pump P2 is operated by the excess voltage to suction the air from the inner space of the engine case 20. Thereby, pumping losses can be reduced and heat generation in the regulator 72 can be suppressed. In addition, supply of the excess voltage to the electronic circuit 80 including the controller 100 can be inhibited. Furthermore, the regulator 72 enables the voltage to be suitably supplied with a correct value to electronic circuit 80 irrespective of the engine speed of the engine E.

The switching device 71 is constructed of a device such as a MOSFET or a diode using a known technique, and will not be further described. The connection configuration illustrated in FIG. 5 is merely exemplary and other configurations may be employed so long as the generator 70 generates the electric power more than that consumed in the electronic circuit 80 and the electric pump P2 is able to be operated by the excess electric power.

Whereas the in-line four-cycle four-cylinder engine E of the present invention is mounted in the motorcycle 1 of a road sport type, it may alternatively be mounted in other vehicles such as motorcycles of a cruiser type, four-wheeled all terrain vehicles, or small personal watercraft. The present invention is applicable to engines other than the four-cylinder engine and V-type engine. Furthermore, the structure of the breather 30 is not intended to be limited to the above described structure.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A four-cycle engine comprising:
   an engine case including a crank chamber that is configured to accommodate a crankshaft and a transmission chamber that is substantially separated from the crank chamber and is configured to accommodate a transmission, the crank chamber being disposed such that a cylinder block of the engine is provided on the crank chamber;
   a pump that includes an inlet and an outlet and is configured to suction air from an inner space of the engine case through the inlet and to discharge the air outside the engine case through the outlet; and
   an air suction passage that has one end portion configured to open in the inner space of the engine case and an opposite end portion coupled to the inlet of the pump to discharge the air outside the engine case; wherein
   the air suction passage extends to the pump through an upper region of the engine case.

2. The four-cycle engine according to claim 1, wherein the one end portion of the air suction passage is positioned at a location lateral to a rotatable element in a direction along a rotational axis of the rotatable element in the vicinity of the rotational axis, the rotatable element being configured to rotate in association with the crankshaft.

3. The four-cycle engine according to claim 2, further comprising:
   a transmission configured to change a rotational speed of the crankshaft;
   wherein the crankshaft has a drive gear which is rotatable integrally with the crankshaft and the transmission has a driven gear which is rotatable in association with the drive gear in mesh with the drive gear, and the rotatable element is the driven gear.

4. The four-cycle engine according to claim 1, further comprising:
   a generator configured to generate electric power by rotation of the crankshaft, wherein the pump is an electric pump configured to operate by the electric power generated in the generator.

5. The four-cycle engine according to claim 4, further comprising:
   a pump operation control unit configured to cause the electric pump to operate when a voltage of the electric power generated in the generator is a predetermined value or more, in a state where the engine is running.

6. The four-cycle engine according to claim 1, further comprising:
   a breather that is disposed upstream of the pump in an air flow direction and between the engine case and the pump and is configured to separate oil from the air.

7. The four-cycle engine according to claim 6, further comprising:
   an air-intake system configured to guide the air taken in from outside to a combustion chamber formed by the cylinder block and a cylinder head; and
   an air guide passage through which the outlet of the pump and air-intake system are coupled to each other;
   wherein the air that has flowed through the outlet of the pump is guided to the air-intake system through the air guide passage.

8. The four-cycle engine according to claim 1,
wherein the one end portion of the air suction passage that is closer to the engine case opens in an inner space of the crank chamber, the engine further comprising:
an air supply passage including an upstream end portion coupled to the outlet of the pump and a downstream end portion configured to open in the inner space of the transmission chamber; and
an air discharge passage including an upstream end portion configured to open in the inner space of the transmission chamber;
wherein the air suctioned through the air suction passage by the pump is delivered to the transmission chamber through the air supply passage and then guided to outside the engine case through the air discharge passage.

9. The four-cycle engine according to claim 8, further comprising:
a control valve that is provided in the air discharge passage and is configured to control an internal pressure of the transmission chamber.

10. A motorcycle comprising:
a four-cycle engine including:
an engine case including a crank chamber that is configured to accommodate a crankshaft and a transmission chamber that is substantially separated from the crank chamber and is configured to accommodate a transmission, the crank chamber being disposed such that a cylinder block of the engine is provided on the crank chamber;
a pump that includes an inlet and an outlet and is configured to suction air from an inner space of the engine case through the inlet and to discharge air outside the engine case through the outlet; and
an air suction passage that has one end portion configured to open in the inner space of the engine case and an opposite end portion coupled to the inlet of the pump to discharge the air outside engine case;
wherein the air suction passage extends to the pump through an upper region of the engine case.

* * * * *